US010763715B2

(12) United States Patent
Loder et al.

(10) Patent No.: US 10,763,715 B2
(45) Date of Patent: Sep. 1, 2020

(54) NANO-CRYSTALLINE COATING FOR MAGNET RETENTION IN A ROTOR ASSEMBLY

(71) Applicants: Rolls-Royce North American Technologies, Inc., Indianapolis, IN (US); Rolls-Royce PLC, London (GB)

(72) Inventors: David Loder, Carmel, IN (US); Ellis Fui Hen Chong, Derby (GB); Edward Claude Rice, Indianapolis, IN (US)

(73) Assignees: Rolls Royce North American Technologies, Inc., Indianapolis, IN (US); Rolls Royce PLC, London (GB)

( * ) Notice: Subject to any disclaimer, the term of this patent is extended or adjusted under 35 U.S.C. 154(b) by 168 days.

(21) Appl. No.: 15/855,956

(22) Filed: Dec. 27, 2017

(65) Prior Publication Data

US 2019/0199151 A1    Jun. 27, 2019

(51) Int. Cl.
| | |
|---|---|
| H02K 1/28 | (2006.01) |
| H02K 1/27 | (2006.01) |
| H02K 15/03 | (2006.01) |
| C25D 7/00 | (2006.01) |
| H02K 1/02 | (2006.01) |
| C25D 5/10 | (2006.01) |

(52) U.S. Cl.
CPC ............... *H02K 1/28* (2013.01); *C25D 5/10* (2013.01); *C25D 7/001* (2013.01); *H02K 1/02* (2013.01); *H02K 1/276* (2013.01); *H02K 1/278* (2013.01); *H02K 15/03* (2013.01); *H02K 2213/03* (2013.01)

(58) Field of Classification Search
CPC ............ H02K 1/27; H02K 1/278; H02K 1/28; H02K 1/02; H02K 1/276; H02K 15/03; H02K 2213/03; C25D 5/10; C25D 7/001
See application file for complete search history.

(56) References Cited

U.S. PATENT DOCUMENTS

| | | | |
|---|---|---|---|
| 4,742,259 A | 5/1988 | Schaefer et al. | |
| 4,942,322 A | 7/1990 | Raybould et al. | |
| 4,973,872 A | 11/1990 | Dohogne | |
| 5,252,160 A | 10/1993 | Scanlon et al. | |
| 5,336,558 A | 8/1994 | Debe | |

(Continued)

FOREIGN PATENT DOCUMENTS

| | | |
|---|---|---|
| EP | 1816730 A1 | 11/2005 |
| EP | 2214290 A2 | 8/2010 |

(Continued)

OTHER PUBLICATIONS

McCrea, "Nanovate-NV/ Composite Hybrid Tooling" (aka Carbover) Integran Technologies, Inc., Oct. 24, 2012, 26 pgs.

(Continued)

*Primary Examiner* — Naishadh N Desai
(74) *Attorney, Agent, or Firm* — Shumaker & Sieffert, P.A.

(57) ABSTRACT

A rotor assembly with a rotor hub, a plurality of permanent magnets positioned circumferentially around at least a portion of the rotor hub, and a coating on at least a portion of the plurality of permanent magnets. The coating forming a retaining band that circumferentially extends around the rotor hub and the plurality of permanent magnets. The coating includes a nano-crystalline layer including a metal or metal alloy and defines an average grain size of less than about 50 nanometers (nm).

13 Claims, 5 Drawing Sheets

(56) References Cited

U.S. PATENT DOCUMENTS

| | | | |
|---|---|---|---|
| 5,352,266 A | 10/1994 | Erb et al. | |
| 5,939,146 A | 8/1999 | Lavernia | |
| 6,064,137 A | 5/2000 | Cox | |
| 7,563,331 B2 | 7/2009 | Petzold et al. | |
| 7,692,348 B2* | 4/2010 | Gruenhagen | H02K 1/278 |
| | | | 310/156.01 |
| 7,824,774 B2 | 11/2010 | Palumbo et al. | |
| 7,964,043 B2 | 6/2011 | Petzold et al. | |
| 2002/0158540 A1 | 10/2002 | Lindquist et al. | |
| 2004/0131865 A1 | 8/2004 | Kim et al. | |
| 2005/0205425 A1 | 9/2005 | Palumbo et al. | |
| 2006/0165973 A1 | 7/2006 | Dumm et al. | |
| 2007/0024147 A1* | 2/2007 | Hirzel | H01F 1/14775 |
| | | | 310/191 |
| 2007/0065638 A1 | 3/2007 | Wang et al. | |
| 2007/0087185 A1 | 4/2007 | Wei et al. | |
| 2007/0099027 A1 | 5/2007 | Krishnamurthy et al. | |
| 2007/0110890 A1 | 5/2007 | Berckmans, III et al. | |
| 2007/0141370 A1 | 6/2007 | Kerber | |
| 2009/0081032 A1 | 3/2009 | Moroso et al. | |
| 2009/0229984 A1 | 9/2009 | Schuh et al. | |
| 2009/0289456 A1 | 11/2009 | McLoughlin et al. | |
| 2009/0297720 A1 | 12/2009 | Ramgopal et al. | |
| 2010/0283242 A1 | 11/2010 | Dooley et al. | |
| 2010/0304065 A1 | 12/2010 | Tomantschger et al. | |
| 2011/0256417 A1 | 10/2011 | Cheruvu et al. | |
| 2011/0287249 A1 | 11/2011 | Bayer et al. | |
| 2012/0082541 A1 | 4/2012 | Macchia et al. | |
| 2012/0082551 A1 | 4/2012 | Macchia et al. | |
| 2012/0082553 A1 | 4/2012 | Eleftheriou et al. | |
| 2012/0082556 A1 | 4/2012 | Macchia et al. | |
| 2012/0082559 A1 | 4/2012 | Gugliemin et al. | |
| 2012/0082783 A1 | 4/2012 | Barnett et al. | |
| 2012/0148762 A1 | 6/2012 | Wei et al. | |
| 2012/0167390 A1 | 7/2012 | Rice | |
| 2012/0167590 A1 | 7/2012 | Bettner | |
| 2012/0237789 A1 | 9/2012 | Wang et al. | |
| 2013/0122317 A1 | 5/2013 | Cheruvu et al. | |
| 2013/0125872 A1 | 5/2013 | Konyashin et al. | |
| 2013/0139518 A1 | 6/2013 | Morgan | |
| 2013/0177421 A1 | 7/2013 | De Wergifosse et al. | |
| 2013/0224008 A1 | 8/2013 | Cheung et al. | |
| 2013/0255277 A1 | 10/2013 | Macchia et al. | |
| 2013/0323473 A1 | 12/2013 | Dietsch et al. | |
| 2014/0004352 A1 | 1/2014 | McCrea et al. | |
| 2015/0284834 A1 | 10/2015 | Duval et al. | |
| 2016/0159488 A1 | 6/2016 | Roach et al. | |
| 2017/0033618 A1* | 2/2017 | Liang | C22C 38/12 |

FOREIGN PATENT DOCUMENTS

| | | |
|---|---|---|
| JP | 2011216667 A | 10/2011 |
| WO | 03068673 A2 | 8/2003 |
| WO | 2005100810 A1 | 10/2005 |
| WO | 2007042081 A1 | 4/2007 |

OTHER PUBLICATIONS

Extended Search Report from counterpart European Application No. 18209205.6, dated Jun. 6, 2019, 7 pp.

Response to the Extended Search Report from counterpart European Application No. 18209205.6, dated Jun. 6, 2019, filed Dec. 16, 2019, 69 pp.

* cited by examiner

NANO-CRYSTALLINE COATING FOR MAGNET RETENTION IN A ROTOR ASSEMBLY

TECHNICAL FIELD

The present disclosure is related to electrical rotor assemblies.

BACKGROUND

Electrical machines, such as high-speed electrical generators, may provide high power-density-enabled, high efficiency electrical machine compared to conventional electrical generator designs. Such electrical machines may be of particular interest in weight and/or power-sensitive applications, such as aerospace applications. The electrical machine designs may also provide additional advantages such as increased reliability or the like.

SUMMARY

In some examples, the disclosure describes a rotor assembly that includes a rotor hub, a plurality of permanent magnets positioned circumferentially around at least a portion of the rotor hub, and a coating on at least a portion of the plurality of permanent magnets, where the coating forms a retaining band that circumferentially extends around the rotor hub and the plurality of permanent magnets, where the coating includes a nano-crystalline layer including a metal or metal alloy, and where the nano-crystalline layer defines an average grain size of less than about 50 nanometers (nm).

In some examples, the disclosure describes a method of forming a rotor assembly including coupling a plurality of permanent magnets circumferentially around at least a portion of a rotor hub and depositing a coating on at least a portion of the plurality of permanent magnets, where the coating forms a retaining band that circumferentially extends around the rotor hub and the plurality of permanent magnets, where the coating includes a nano-crystalline layer including a metal or metal alloy, and wherein the nano-crystalline layer defines an average grain size of less than about 50 nanometers (nm).

In some examples, the disclosure describes a rotor assembly including a rotor hub, a plurality of permanent magnets positioned circumferentially around at least a portion of the rotor hub, where at least one permanent magnet of the plurality of permanent magnets defines a mechanical interlock and the rotor hub defines a recess along the circumference of the rotor hub configured to receive the mechanical interlock of the at least one permanent magnet to retain the at least one permanent magnet against the rotor hub and substantially prevent radial movement of the at least one permanent magnet. The rotor assembly also including a coating including a first nano-crystalline layer that substantially encapsulates the at least one permanent magnet, the first nano-crystalline layer including a metal or metal alloy and defining an average grain size of less than about 50 nanometers (nm).

The details of one or more examples are set forth in the accompanying drawings and the description below. Other features, objects, and advantages will be apparent from the description and drawings, and from the claims.

DETAILED DESCRIPTION

In general, the disclosure describes an electrical machine system that includes a rotor assembly including a rotor hub and a plurality of permanent magnets around a circumference of the rotor hub. The electrical machine system can help achieve higher rotational speed and increased power output. The combination of a relatively light-weight rotor hub and coating that includes at least one nano-crystalline layer on the permanent magnets may result in a relatively high strength, relatively low weight article ideal for weight-sensitive applications to help increase the power density of the rotor assembly.

In some examples, the system can be used in rotors of electrical machines. The electrical machines can be a permanent magnet (PM) electrical machine and include a nano-crystalline metal or metal alloy coating that surrounds at least a portion of the plurality of permanent magnets. For example, at least a portion of the coating that includes a nano-crystalline layer may form a retaining band that surrounds the rotor hub and the plurality of permanent magnets to couple the magnets to the rotor hub. Due to the finely controlled grain size of the nano-crystalline layer, the coating may exhibit a surprisingly high tensile strength while also remaining relatively thin. This construction in turn may allow for the overall thickness of coating and to be relatively thin compared to conventional fiber wrapped or metal shrink-fit bands while still providing the appropriate strength and safety characteristics, e.g., due to centrifugal forces imposed on the permanent magnets during operation (rotation of the rotor hub). Reducing the thickness of the retention component by replacing the fiber wrapping or metal shrink-fit bands with coatings that include a nano-crystalline metal or metal alloy may reduce an effective air-gap between the permanent magnets and the corresponding stator assembly that surrounds the rotor assembly. The reduced effective air-gap may lead to increased power capability and increased efficiency of the resulting electrical machine.

Additionally, or alternatively, the individual permanent magnets may be surrounded by the coating such that the individual permanent magnets are substantially encapsulated (e.g., encapsulated or nearly encapsulated) by a portion of the coating that includes at least one nano-crystalline layer and then secured to the rotor hub via a mechanical interlock (e.g., a dove-tail joint or the like that provides a resistance fit). In such examples, the nano-crystalline layer may provide sufficient strength to the shape of the permanent magnet and the coupling of the permanent magnet to the rotor hub to withstand the centrifugal forces during operation.

Figure 1:
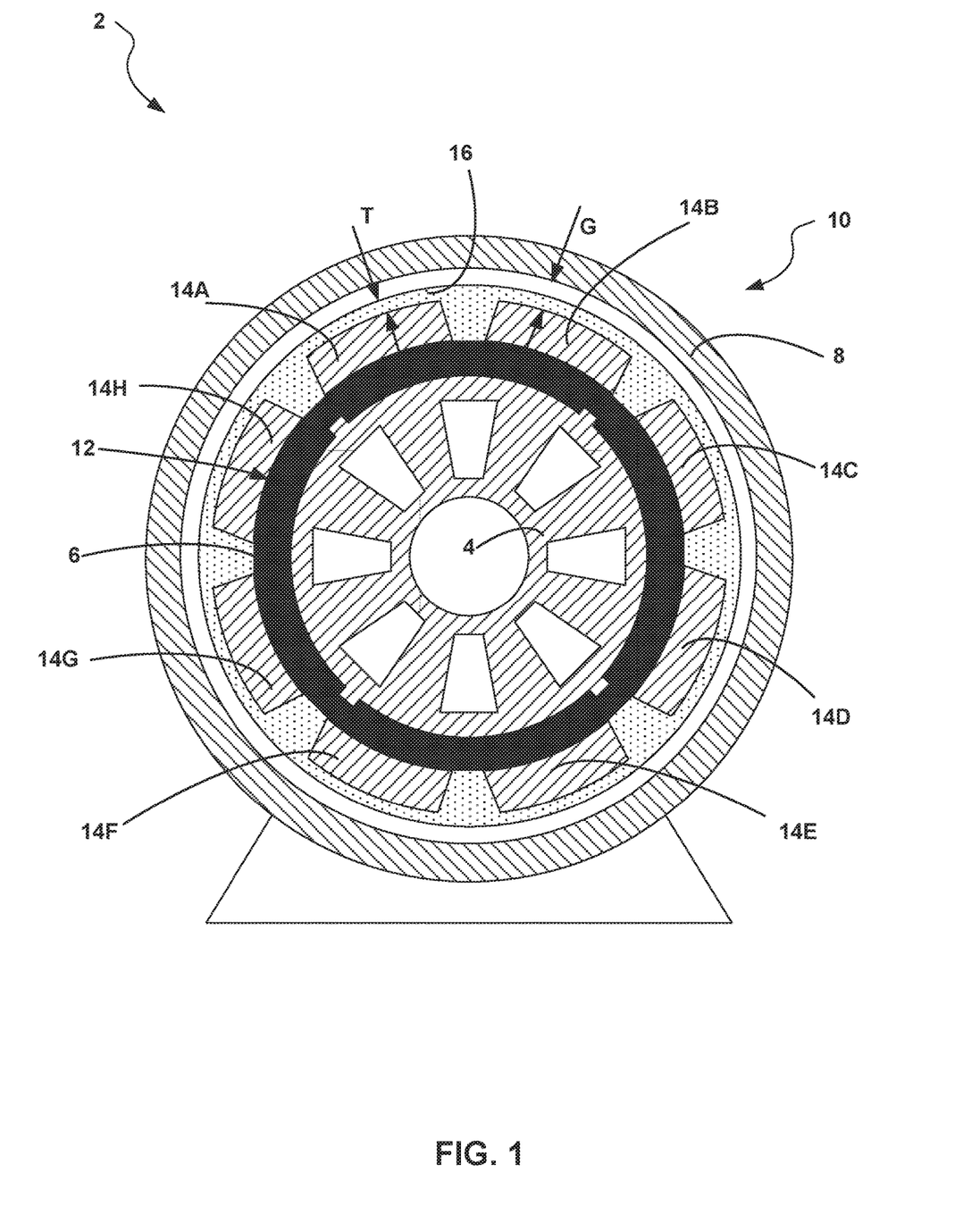
FIG. 1 is a conceptual view of an example electrical machine system with a stator assembly and a rotor assembly that includes a rotor hub with one or more permanent magnets coupled to a circumference of the rotor hub.
Figure 4:
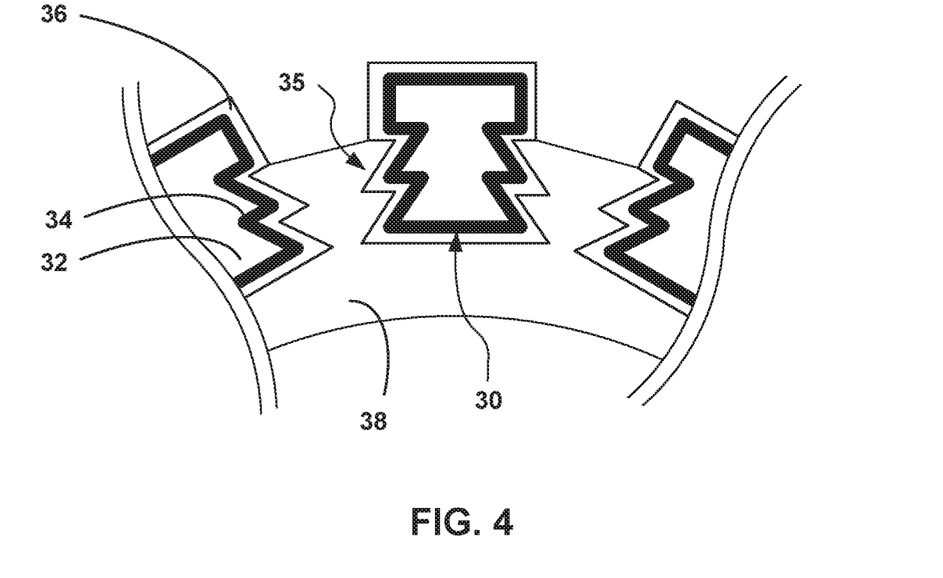
FIG. 4 is a cross-sectional view of the permanent magnet of FIG. 3 mounted into a corresponding recess on a rotor hub via a mechanical interlock.

FIG. 1 is a conceptual view of an example electrical machine system 2 with a stator assembly 8 and a rotor assembly 10 that includes a rotor hub 12 with a plurality of permanent magnets 14A-14H (also referred to as "permanent magnets 14") coupled to a circumference of rotor hub 12. Permanent magnets 14 include a coating 16 on at least portion of the respective permanent magnet. Coating 16 may form a retaining band, a ring, or another cylindrical structure that is positioned circumferentially around at least a portion of rotor hub 12. In another example, as shown in FIG. 4, a portion of coating 16 may be used to substantially encapsulate at least one of permanent magnets 14.

Rotor assembly 10 may be a component for a PM electrical machine such as an electrical motor or generator for use in a blower assembly, compressor, cooling fan, alternator, drive system, mobile directed energy weapon systems, hybrid-electric or distributed-electric aircraft propulsion systems, or other systems that may benefit from the improved strength, improved magnet retention, and reduced weight characteristics provided by the described assembly. Rotor assembly 10 may be installed adjacent to a stator assembly 8. Rotor assembly 10 may be incorporated into an aerospace vehicle or other device where weight reduction is a priority.

Rotor hub 12 may be formed using any suitable technique. For example, rotor hub 12 may be formed using a cast molding process, computer numerical control (CNC) milling, or the like using a suitable metal or metal alloy. In some examples, rotor hub 12 may include one or more high-strength metals or metal alloys such as titanium, titanium alloy, stainless steel, magnetic steel (e.g., ferritic stainless steel), iron or iron laminate (cobalt iron laminate), high-strength composite materials such as glass-fiber reinforced composites (E-glass or S-glass) or carbon-fiber reinforced composites, or the like.

In some examples, rotor hub 12 may include a multi-component construction. For example, rotor hub 12 may include a radially inner portion 4 (e.g., an interior hub segment or core of rotor hub 12) connected to a radially outer segment 6 (e.g., a rotor magnetic core). Radially inner portion 4 may be a spoked configuration with an inner ring, an outer ring, and spokes connecting the inner and outer rings. In some examples, radially inner portion 4 may be composed any suitable material including, for example, a high-strength metal or metal alloy such as titanium, titanium alloy, or stainless steel. Radially outer segment 6 (e.g., a rotor magnetic core) may be composed of ferromagnetic material such as, for example, cobalt iron laminate or other suitable material. In some examples, radially outer segment 6 (e.g., cobalt iron laminate) may present a lower magnetic reluctance and serve as a magnetic return path in order to reduce the permanent magnet requirement, while the inner portion provides better structural integrity and torque load transfer. In other arrangements, such as where permanent magnets 14 are arranged in a Halbach array, rotor hub 12 may be constructed without the inclusion of such ferromagnetic materials.

Depending on the type of material used, rotor hub 12 may exhibit a coefficient of thermal expansion (CTE) between about 8 ppm/° C. to about 11 ppm/° C. at room temperature (e.g., 25° C.). For example, titanium has a CTE of about 8.5 ppm/° C., cobalt iron laminate has a CTE of about 9 ppm/° C., and stainless steel has a CTE of about 10 ppm/° C. In some examples, rotor hub 12 may be configured to have substantially the same (e.g., the same or nearly the same) CTE as permanent magnets 14 or layers or coating 16. In other examples, for reasons describe further below, rotor hub 12 may be configured to have a CTE more than the CTE of one or more of the layers of coating 16 such that as rotor assembly 10 heats up during use, coating 16 will produce a radial compressive force on rotor hub 12 and permanent magnets 14 as the parts expand.

Rotor hub 12 may be any suitable size and shape. In some examples, rotor hub 12 may be disk-shaped or cylindrical-shaped. Rotor hub 12 may define an outer diameter may be sized according to the power and speed requirements of the electrical machine system 2 and can vary depending on the type of application. In some examples, rotor hub 12 may be between about 50 mm to about 150 mm, however other suitable sizes may also be used.

Rotor assembly 10 also includes a plurality of permanent magnets 14 attached at the periphery of rotor hub 12 (e.g., along a circumference of rotor hub 12). Permanent magnets 14 may be composed of any suitable hard-magnetic material, e.g., a material that may be magnetized and will remain magnetized when removed from proximity to an external magnetic field. In some examples, permanent magnets 14 may include, but are not limited alnico alloys (e.g., nickel/cobalt/iron/aluminum alloy), hard ferrites, rare-earth magnets, neodymium iron boron alloy, samarium cobalt alloy, or ceramic magnets. In some examples, permanent magnets 14 may include samarium cobalt alloy magnets. Additionally, or alternatively, permanent magnets 14 may include materials that have a coercivity greater than 10,000 A/m and/or a remnant magnetic field of 500 gauss or greater.

In some examples, permanent magnets 14 may be provided as a singular magnet structure in the in the general shape of a ring or cylinder and positioned coaxially over rotor hub 12. Additionally, or alternatively, permanent magnets 14 may represent plurality of individual permanent magnets independently positioned circumferentially around at least a portion of rotor hub 12 as shown in FIG. 1. In general, the details regarding permanent magnets 14 are intended to describe both scenarios where rotor assembly 10 includes only a singular magnet structure containing a plurality of permanent magnets 14 or where rotor assembly 10 includes a plurality of individual permanent magnets 14. In some examples, plurality of permanent magnets 14 may be arranged in a Halbach array such that the permanent magnets augment the magnetic field about the periphery of rotor assembly 10 (e.g., the radial exterior of rotor assembly 10) while cancelling the field to near zero on the interior side of rotor assembly 10 (e.g., near the intersections between permanent magnets 14 and rotor hub 12).

As described further below, in some examples, permanent magnets 14 may be shaped to each include one or more mechanical interlocks (e.g., dove-tail joints) that correspond with respective recesses on rotor hub 12 to provide a friction fit that helps retain permanent magnets 14 to rotor hub 12. Additionally, or alternatively, permanent magnets 14 may be attached to rotor hub 12 using an adhesive such as an epoxy-based adhesive, a urethane-based adhesive, a silicone-based adhesive, or the like.

The materials forming permanent magnets 14 are often brittle. During rotations, the bodies of permanent magnets 14 may break or become dislodged from rotor hub 12 due to the high centrifugal forces exerted on permanent magnets 14. Ensuring proper magnet retention is therefore important to obtain higher rotational speeds and increased power densities from rotor assembly 10. While permanent magnets 14 may be secured to rotor hub 12 using an adhesive bonding, such bonds alone may be insufficient to couple permanent magnets 14 to rotor hub 12 at high speeds, thereby requiring rotor assembly 10 to be operated at a lower speed.

In some examples, permanent magnets 14 may be coupled to rotor hub 12 with the use of a retaining sleeve composed of a high-strength alloy, such as Inconel, that is shrunk-fit over permanent magnets 14 and rotor hub 12 to secure permanent magnets 14 in place. However, such metallic sleeves may produce eddy-currents. These eddy-currents can create undesirable heating of permanent magnets 14. Reinforced polymeric retaining rings may be used as an alternative to the metallic sleeves to eliminate eddy currents, but such polymeric rings may deform over time. In addition, both types of retaining sleeves may increase the magnetic reluctance seen by the magnet, which may reduce the mutual coupling. Furthermore, such retaining sleeves may be relatively thick and non-uniformly dispersed around rotor hub 12. The non-uniformity of the sleeves may lead to increased vibration or noise during use, and the thickness of the sleeves increases the effective air-gap (e.g., (G) in FIG. 1) between permanent magnets 14 and stator assembly 8, thereby reducing the power density of the machine, require more magnetic material to be incorporated into rotor assembly 10 to overcome the effective air-gap (G), or both.

To address one of more of these limitations, rotor assembly 10 includes a coating 16 surrounding at least a portion of permanent magnets 14 that includes at least one layer of metal or metal alloy that defines a fine-grained microstructure. A layer with a fine-grained microstructure may include a nano-crystalline layer comprising a metal or metal alloy, where the layer defines an average grain size of less than about 50 nanometers (nm).

In some examples, the reduced grain size of such nano-crystalline layers surprisingly increases the relative tensile strength of the resultant layer as well as the overall hardness of the layer, such that coating 16 may be significantly stronger and more durable compared to conventional metallic or alloy coatings (e.g., coarse-grained metal or alloy coatings having an average grain size larger than about 50 nanometers (nm)) of the same composition and thickness. As one example, a coating composed of coarse-grained nickel formed using conventional electro-plating techniques may define an ultimate tensile strength on the order of about 400 MPa. In contrast, a fine-grained nickel layer of comparable thickness may exhibit an ultimate tensile strength on the order of about 2000 MPa or more depending on the final average grain size. In some examples, the nano-crystalline layers described herein may define an average grain size of less than about 50 nm, less than about 20 nm, less than about 10 nm, or less than about 5 nm. Decreasing the average grain size may increase the ultimate tensile strength of the layer.

The at least one nano-crystalline layer of coating 16 may include one or more pure metals or metal alloys including, for example, cobalt, nickel, copper, iron, cobalt-based alloys, nickel-based alloys, nickel-cobalt alloys, copper-based alloys, iron-based alloys, cobalt phosphorous alloys, or the like. As described further below with respect with FIG. 2, the at least one nano-crystalline layer of coating 16 may be used in combination with other nano-crystalline layers or layers formed using of conventional materials or techniques (e.g., coarse-grained metallic layers, carbon fiber composite banding materials, or the like).

Coating 16, including the at least one nano-crystalline layer, may be formed using any suitable plating technique, such as electrodeposition. For example, rotor hub 12 and permanent magnets 14 may be suspended in suitable electrolyte solution that includes the selected metal or metal alloy for the at least one nano-crystalline layer. A pulsed or direct current (DC) may then be applied to rotor hub 12 and permanent magnets 14 to plate at least a portion of permanent magnets 14 with the fine-grained metal to form the nano-crystalline layer to a desired thickness and average grain size. In some examples, a pulsed current may be utilized to obtain an average grain size less than about 50 nm (e.g., less than about 20 nm). In some examples, one or more of the at least one nano-crystalline layer that forms part of coating 16 may include electrodeposited nickel. In some examples, coating 16 can be deposited within a temperature range of 50-65° C.

In some examples, prior to the electrodeposition process, portions of permanent magnets 14 and rotor hub 12 may be initially metallized at select locations with a base layer of metal to facilitate the deposition process of forming the at least one nano-crystalline layer of coating 16. For example, a metallized base layer on permanent magnets 14 and rotor hub 12 may be produced using, for example, electroless deposition, physical vapor deposition (PVD), chemical vapor deposition (CVD), cold spraying, gas condensation, and the like. The metallized base layer may be selectively deposited around the portions of permanent magnets 14 and rotor hub 12 intended to receive coating 16. In some examples, the layer formed using metallization may include one or more of the metals used to form part of coating 16. Once metallized, the metallized layer may provide an electrical current pathway to perform the electrodeposition.

As shown in FIG. 1, at least a portion of coating 16 may surround permanent magnets 14 and form a retaining band that circumferentially extends around rotor hub 12 and permanent magnets 14 (e.g., around a singular permanent magnet or a plurality of permanent magnets). The retaining band may be characterized as the portion (e.g., one or more layers) of coating 16 that forms a continuous loop (e.g., ring, cylinder, collar, or the like) around the periphery or circumference of rotor hub 12 such that permanent magnets 14 are positioned between the portion of coating 16 forming the retaining band and rotor hub 12. In some such examples, the portion of coating 16 that forms the retaining band may include at least one nano-crystalline layer.

In some examples, the increased strength and hardness of the at least one nano-crystalline layer of coating 16 that form part of the retaining band may allow for the retaining band to remain relatively thin. For example, each of the at least one nano-crystalline layers within coating 16 may define a layer thickness (e.g., thickness measured from the coated surface in a direction normal to the coated surface) between about 0.025 mm (e.g., about 1 mil) to about 0.25 mm (e.g., about 10 mils) without sacrificing the desired strength and hardness characteristics of the layer. In some examples, the finely-controlled deposition of the structure of the nano-crystalline layer of coating 16 and its predictable performance in respect to its material properties. The increased confidence in the material performance of the retaining band may allow for the desired safety margin to be reduced and allow for the portion of coating 16 forming the retaining band to define a reduced overall thickness. For example, for a rotor hub 12 having about a 110 mm outer diameter, the thickness of coating 16 may be reduced from about 2.5 mm (e.g., thickness of a conventional retaining sleeve) to less than about 2.0 mm, less than about 1.5 mm, or less than about 1.25 mm measured in a radial direction of rotor hub 12 (e.g., thickness (T) of FIG. 1 representing the portion of coating 16 formed on permanent magnets 14 and forming the continuous loop).

The overall thickness (T) of the portion of coating 16 forming the retaining band may be significantly less than the thicknesses associated with conventional magnetic retention techniques. For example, in examples where a retaining sleeve is formed using only a carbon fiber reinforced banding, the band thickness may be on the order of about 2.5 mm to maintain the tensile stress with a safety factor of 2 to 3 below the yield strength of the banding, which may be 1600-1900 MPa. Other examples, such as a titanium retaining sleeve, may require a thickness of about at least about 4 mm to remain within the safety factor for a tensile strength of 1100 MPa.

In some examples, by reducing the overall thickness (T) of the portion of coating 16 forming the retaining band, the effective air gap between permanent magnets 14 and magnetic structures of stator assembly 8 can be reduced by reducing the spacing between permanent magnets 14 and adjacent stator assembly 8. For example, coating 16, which includes at least one nano-crystalline layer, may have a yield strength of at least about 1100 MPa (e.g., nano-crystalline nickel iron alloy has an ultimate tensile strength of about 1100 MPa or more while nano-crystalline cobalt phosphorus alloy has an ultimate tensile strength of about 1600 MPa or more), which is competitive with composites (up to about 1900 MPa for carbon-fiber composites) and titanium (up to about 1100 MPa) type retaining sleeves. In some examples, coating 16 may have a yield strength of at least about 1600 MPa. Furthermore, coating 16 may provide a higher degree of confidence in the material properties of the retaining band compared to the other retaining sleeves due to reproducibility in how coating 16 is formed and the consistency of how the coating will perform and behave, even at the reduced thickness.

Additionally, or alternatively, depositing a relatively thin layer of coating 16 on rotor hub 12 may help reduce the overall weight of rotor assembly 10 by reducing the volume of denser metals or metal alloys (e.g., steel) that are otherwise used in forming the thick and heavy alternative retaining sleeves.

The ability to retain permanent magnets 14 with only a thin coating 16 may also provide other benefits over competing solutions. For example, by reducing the distance between permanent magnets 14 and adjacent stator assembly 8, permanent magnets 14 may exhibit an increased magnetic coupling in comparison to other systems that define a larger effective air-gap due to, for example, thick conventional retaining sleeves. In turn, system 2 may require less magnet mass to achieve the same air-gap flux density compared to other assemblies. In turn, the overall weight of rotor assembly 10 may be reduced and the centrifugal stresses will be reduced on permanent magnets 14 and coating 16 due to the lower weight of permanent magnets 14. This in turn may lead to additional benefits such as allowing for higher rotational speed and increased power output from electrical machine system 2. For example, reducing the thickness of the portion of coating 16 forming the retaining band from about 2.5 mm to about 1.25 mm could allow the air-gap (G) to likewise be reduced. In such examples, permanent magnets 14 will be closer to stator assembly 8 and thus require less material to maintaining the same airgap flux density as the prior construction. This in turn, may allow for the radial thickness of permanent magnets 14 to likewise be reduced. For example, for a rotor hub 12 having about 110 mm outer diameter, the a radial thickness of permanent magnets 14 may be reduced from about 7 mm to about 5 mm due to the reduced air-gap. In some such examples, assuming 50% of the retaining hoop stress is due to the rotating mass of permanent magnets 14, the rotational speed of rotor hub 12 could be increased by about 15% with the reduced magnet depth, while still maintaining the same stress as an assembly where the magnet depth is not reduced. In total, this effect could result in effectively a 15% increase in power density of rotor assembly 10.

In addition to the above, due to the ability to have a finely controlled nano-structure when forming the at least one nano-crystalline layers of coating 16, the resultant thickness of coating 16 may be substantially uniform (e.g., uniform or nearly uniform in thickness). Having a thin layer of uniform thickness of coating 16, instead of a thicker titanium retaining sleeve for example, may reduce the heat generated by eddy currents of the rotating rotor assembly 10 compared to conventional retaining sleeves, thereby improving the operational characteristics of rotor assembly 10. Additionally, the substantially uniform thickness of coating 16 may allow for the material properties and material fatigue characteristics to be highly predictable and consistent from unit to unit and/or reduce the presence of vibration and noise in the system do to an unbalanced rotor assembly 10. The combination of the relatively light-weight rotor hub 12 and coating 16 may result in a relatively high strength, relatively low weight article ideal for weight-sensitive applications.

Figure 2:
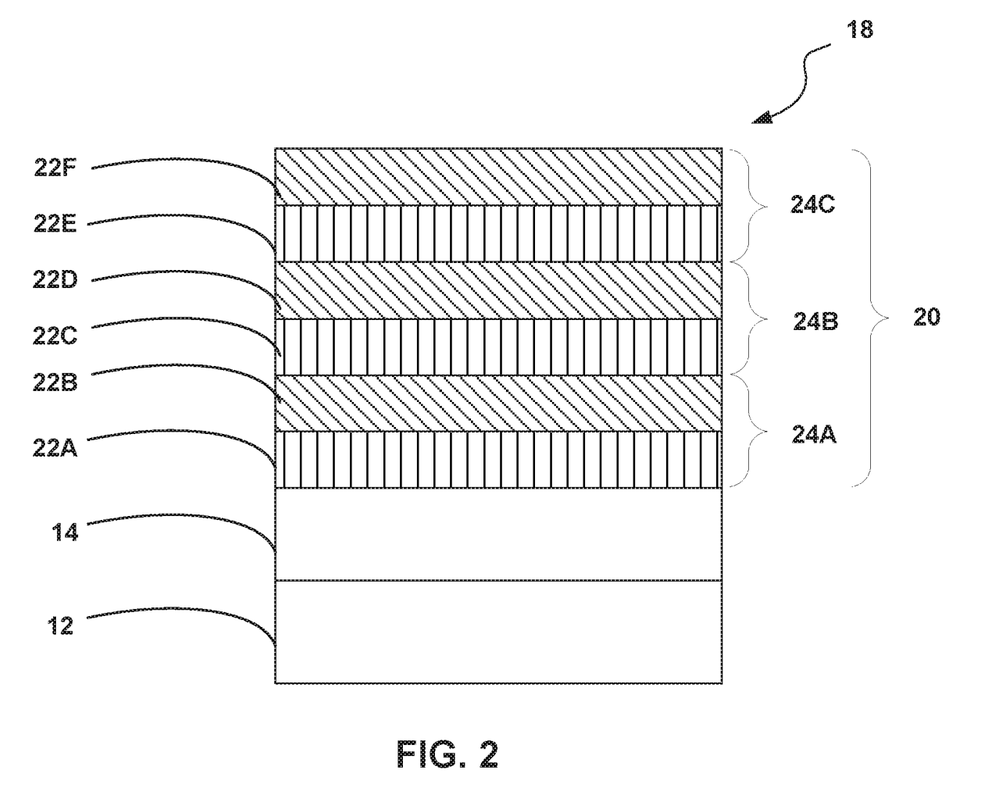
FIG. 2 is a conceptual cross-sectional view of a portion of an example rotor assembly that includes a rotor hub and one or more permanent magnets, along with a coating that includes a plurality of layers, including at least one nano-crystalline layer.

In some examples, coating 16 may include a plurality of layers including at least one nano-crystalline layer. FIG. 2 is a conceptual cross-sectional view of an example rotor assembly 18 that includes rotor hub 12, a permanent magnet 14, and a coating 20 that includes a plurality of layers 22A-22F (collectively referred to as "plurality of layers 22" or "layers 22"). Layers 22 include at least one nano-crystalline layer. Coating 20, like coating 16 described above with respect to FIG. 1, may be on at least a portion of one or more of permanent magnets 14 and may be used similar to coating 16 of FIG. 1. The details described above regarding coating 16 may also describe coating 20.

In some examples, all layers of plurality of layers 22 may be nano-crystalline layers that define an average grain size of less than about 50 nanometers (nm). In other examples, some of plurality of layers 22 may be layers that include coarse-grained metal or metal alloys such that coating 20 includes one or more coarse-grained layers in combination with at least one nano-crystalline layer. In some examples, plurality of layers 22 of coating 20 may form a retaining band that that circumferentially extends around rotor hub 12

Collectively, plurality of layers 22 of coating 20 may form a retaining band that circumferentially extends around rotor hub 12 and permanent magnets 14 to secure permanent magnets 14 to rotor hub 12. As described above, by including at least one nano-crystalline layer (e.g., one or more of plurality of layers 22) in coating 20, coating 20 may exhibit a relatively high tensile strength and overall hardness compared to conventional retaining sleeves while the overall thickness of coating 20 may remain relatively thin (e.g., less than about 1.5 mm).

In some examples, the strength and retention properties of the portion of coating 20 forming the retaining band may be increased by configuring coating 20 to include at least two layers that define different coefficients of thermal expansion (CTE). For example, first layer 22A may define a first CTE, and a second layer 22B may define a second CTE that is less than the first CTE. By altering the CTE's of plurality of layers 22 in this way, one or more of layers 22 may induce a compressive stress (e.g., towards the central axis of rotor hub 12) on permanent magnets 14 and any underlying layers 22 at room temperature or as the temperature of rotor assembly 10 increases. As first layer 22A and second layer 22B expand at different rates with rising temperatures, second layer 22B, having the lower CTE and forming a continuous radial loop over first layer 22A, will produce compressive stress on first layer 22A and the plurality of permanent magnets 14 coupled to rotor hub 12. The compressive stresses imposed by plurality of layers 22 may mimic the shrink-fit characteristics a conventional metal retaining sleeve or ring.

In some examples, each of plurality of layers 22 may comprise a metal or metal alloy that defines a CTE between about 7 ppm/° C. and about 13 ppm/° C. In some examples, the first CTE may be greater than the second CTE. In some examples, the first CTE may be greater than about 13 ppm/° C., and the second CTE may be less than about 7 ppm/° C. Additionally, or alternatively, the first and second CTEs may differ by at least about 4 ppm/° C., such as at least about 6 ppm/° C.

In some examples, the layers with higher relative CTEs (e.g., first layer 22A) may be formed with conventional materials (e.g., coarse-grained metallic layers such as Inconel or titanium, carbon fiber composite banding materials, or the like) while the layers with lower relative CTEs (e.g., second layer 22B) may be formed as a nano-crystalline layer. In other examples, both first and second layers 22A and 22B may include nano-crystalline layers.

As described above, due to the ability to finely control nano-crystalline structure, a given nano-crystalline layer (e.g., first layer 22A and/or second layer 22B) can produce a high tensile strength while remaining relatively thin and high hardness Vickers Pyramid Number (HV) of greater than about 400 HV. In some examples, each layer of plurality of layers 22 may define a thickness between about 0.025 mm (e.g., about 1 mil) to about 0.25 mm (e.g., about 10 mils) and the overall thickness of coating 20 may be less than 1.5 mm.

In some examples, the individual thickness of plurality of layers 22 may be varied along with the CTEs of layers 22 to further affect the compressive forces between the layers. For example, a given layer 22 that exhibit a lower tensile strength may be configured to be thicker than a different layer 22 that exhibits a higher tensile strength. As one non-limiting example, if first layer 22A includes nano-crystalline cobalt or cobalt alloy (e.g., ultimate tensile strength of about 1600 MPa or more) and second layer 22B includes nano-crystalline nickel iron alloy (e.g., ultimate tensile strength of about 1100 MPa or more), first layer 22A may be configured to have a lower thickness (e.g., about half) compared to the thickness of second layer 22B.

In some examples, plurality of layers 22 may include one or more layer sets 24A-24C composed of a pair of layers with different CTEs. For example, first layer set 24A may include first layer 22A defining a first CTE and second layer 22B defining a second CTE. One or both of first and second layers 22A and 22B may comprise a nano-crystalline layer (e.g., a layer that defines an average grain size of less than about 50 nanometers (nm)) that includes a metal or metal alloy. Additionally, or alternatively, at least the most radial layer of a given layer set (e.g., second layer 22B of first layer set 24A) may comprise a nano-crystalline layer.

In some examples, the one or more layer sets 24A-24C may be substantially the same (e.g., the same or nearly the same) such that layers 22A, 22C, and 22E are formed of a same first metal or metal alloy and layers 22B, 22D, and 22F are formed of a same second metal or metal alloy. In such examples, plurality of layers 22 may be characterized as alternating layers or a first metal or metal alloy and a second metal or metal alloy that define different CTEs. Each layer 22 in a given layer set 24A-24C may be selected and arranged to achieve the desired physical, thermal, chemical (e.g., corrosion resistance), or magnetic characteristics. For example, first layer 22A may include nano-crystalline nickel, nickel alloy (e.g., nickel-iron alloy), or the like and second layer 22B may include nano-crystalline cobalt, cobalt alloy (e.g., cobalt-phosphorous alloy), or the like. In some examples, each layer 22 may be selected to withstand operating temperatures of about 250° C. to about 350° C. and exhibit strong corrosion resistance. In some examples, the first layer set 24A may include a layer (e.g., nano-crystalline layer) of nickel-iron alloy and a layer (e.g., nano-crystalline layer) of cobalt-phosphorous alloy.

As one non-limiting example, one or more layer sets 24A-24C may each include first layer 22A of cobalt alloy (e.g., nano-crystalline cobalt alloy with a CTE of about 13 ppm/° C.) and second layer 22B of nickel alloy (e.g., nano-crystalline nickel-iron alloy with a CTE of about 7 ppm/° C.).

In some examples, one or more of plurality of layers 22 of coating 20 may be deposited on permanent magnets 14 at a temperature (e.g., about 50° C. to about 65° C.) to induce a pre-stress on permanent magnets 14 when rotor assembly 10 is cooled to room temperature. When compared to 20° C. room temperature, this results in a contraction coefficient (e.g., about 0.04% for cobalt alloy and about 0.02% for nickel-iron alloy) generated by the layers 22, which may generate a compressive force on permanent magnets 14. In some examples, layers 22 may be configured to result in a compressive stress on permanent magnets 14 at room temperature that is less than the compressive strength of permanent magnets 14 (e.g., samarium-cobalt has a compressive strength of about 800 MPa).

An example of the resulting compressive force that may be produced by plurality of layer 22 with different CTEs is shown in Table 1, which is an example alternating four-layer coating of nano-crystalline cobalt alloy and nickel-iron alloy layers to produce a compressive stress on samarium-cobalt magnets. This design configuration achieves a compressive strength of about 310 MPa without exceeding material limits (e.g., 800 MPa for the samarium-cobalt magnets). This calculation considers only circumferential shrinkage of the coating and hub, and only radial shrinkage of the magnets.

TABLE 1

An example of a four-layer coating to obtain compressive stress on samarium-cobalt magnets.

| Layering Structure | | | |
|---|---|---|---|
| Layer Number | Coating Material | Contraction (%) | Thickness (mils) |
| 1 | Cobalt Alloy | 0.04 | 5 (127 µm) |
| 2 | Nickel-iron Alloy | 0.02 | 10 (254 µm) |
| 3 | Cobalt Alloy | 0.04 | 5 (254 µm) |
| 4 | Nickel-iron Alloy | 0.02 | 10 (254 µm) |
| Magnet Compression | | | |
| Magnet Thickness | | 275 mils (7 mm) | |
| Magnet Outer Radius | | 4330 mils (110 mm) | |
| Magnet Compressive Stress | | 310 MPa | |

Figure 3:
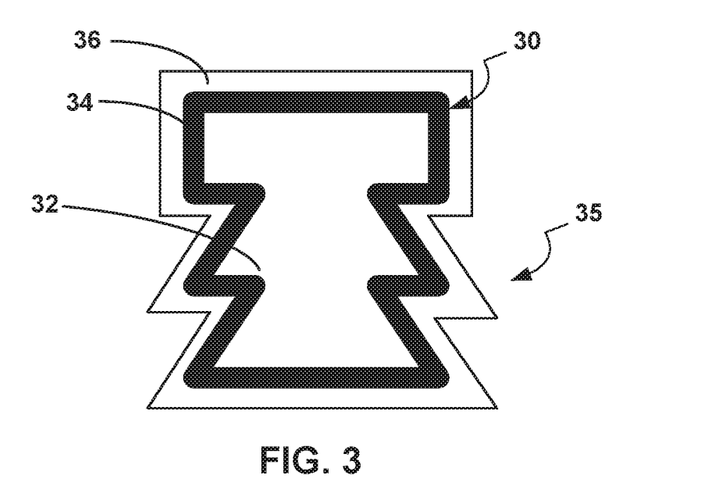
FIG. 3 is a conceptual cross-sectional view of an example permanent magnet that includes a coating on the permanent magnet.

In some examples, coating 16 may be applied such that it surrounds each individual permanent magnet 14 and substantially encapsulates permanent magnets 14. FIG. 3 shows a conceptual cross-sectional view of an example permanent magnet 30 that includes a coating 36 on permanent magnet 30 that substantially encapsulates permanent magnet 30. Permanent magnet 30 includes a magnetic core 32 and a polymer layer 34 over magnetic core 32. Coating 36 substantially encapsulates (e.g., encapsulates or nearly encapsulates) permanent magnet 30 and includes at least one nano-crystalline layer. In rotor assembly 10 of FIG. 1, permanent magnet 30 may be one of permanent magnets 14 and coating 36 may similar in composition and used independently or in conjunction with coating 16.

Magnetic core 32 may include one or more of the hard-magnetic materials described above. For example, magnetic core 32 may include, but is not limited alnico alloys (e.g., nickel/cobalt/iron/aluminum alloy), hard ferrites, rare-earth magnets, neodymium iron boron alloy, and samarium cobalt alloy, ceramic magnets. In some examples, magnetic core 32 may include samarium cobalt alloy magnets. Additionally, or alternatively, magnetic core 32 may include materials that have a coercivity greater than 10,000 A/m and/or a remnant magnetic field of 500 gauss or greater. In some examples, magnetic core 32 may be a sintered magnet.

Polymer layer 34 may be used for shaping permanent magnet 30 and as a substrate for coating 36. Polymer layer 34 may include one or more polymer materials including for example, polymeric materials such as polyether ether ketone (PEEK), polyamide (PA), polyimide (PI), bis-maleimide (BMI), epoxy, phenolic polymers (e.g., polystyrene), polyesters, polyurethanes, silicone rubbers, copolymers, polymeric blends, polymer composites such as carbon fiber reinforced PEEK, polymer coated metals, and the like.

In some examples, polymer layer 34 may be initially metallized with a base layer of metal to facilitate the deposition process of forming coating 36. For example, a metallized base layer on polymer underlay 34 may be produced using, for example, electroless deposition, physical vapor deposition (PVD), chemical vapor deposition (CVD), cold spraying, gas condensation, and the like. The metallized base layer may be selectively deposited around the portions of polymer underlay 34 intended to receive coating 36. In some examples, the layer formed using metallization may include one or more of the metals used to form part of coating 36. Once metalized, the metallized layer may provide the proper electrical current pathway to perform electrodeposition.

Coating 36 may substantially encapsulate (e.g., encapsulate or nearly encapsulate) permanent magnet 30 and may include at least one nano-crystalline layer. The at least one nano-crystalline layer of coating 36 may act as a high strength protective casing for individual permanent magnet 30 and may allow for permanent magnet 30 to substantially retain its shape during rotational operation. For example, the materials used for magnetic core 32 tend to be relatively brittle and fragile. In some examples, magnetic core 32 may be plated with a conventional metal plating (e.g., coarse grain metal or metal alloy plating) to improve the structural strength of the magnet, but additional means such as adhesive bonding and/or a retaining sleeve are still needed to couple the individual magnets to rotor hub 12.

To avoid some of the drawbacks associated with adhesive bonding or the retaining sleeve, permanent magnet 30 may be shaped to include at least one mechanical interlock 35 and rotor hub 12 may include a correspondingly shaped recess. Mechanical interlock 35 can be used to couple permanent magnet 30 and rotor hub 12 together based on their correspondingly shaped configurations to overcome centrifugal forces and prevent radial displacement of the two components. This can be accomplished by creating a friction fit between permanent magnet 30 and rotor hub 12 based on their shapes. For example, without limiting the different options for possible shapes and configurations, some shapes and configurations that can be used for mechanical interlock 35 may include dovetail joint, fir-tree recess, triangular, round, or other geometrical shaped joints, wedge-shaped joint, tongue-and-groove, mortise and tenon, or other interference-type joints.

In some examples, mechanical interlock 35 may be used for retention of permanent magnet 30 to rotor hub 38 because of the at least one nano-crystalline layer of coating 36 acting as a high strength protective casing. The shape strength of permanent magnet 30 is improved, thereby permitting only mechanical interlock 35 to couple permanent magnet 30 to rotor hub 12 without the additional need for adhesive or retaining sleeves. Absent the presence of the at least one nano-crystalline layers in coating 36, the mechanical strength of mechanical interlock 35 and permanent magnet 30 may be insufficient to retain permanent magnet 30 to rotor hub 12.

FIG. 4 shows a cross-sectional view of permanent magnet 30 of FIG. 3 mounted into a corresponding recess on rotor hub 38 via mechanical interlock 35. Mechanical interlock 35 is shaped to provide an interference or frictional fit with rotor hub 38. Coating 36 enables an interference-fit for permanent magnet 30 to create a secure fit with rotor hub 38 without the use of adhesive bonding. Rotor hub 38 may be substantially similar to rotor hub 12 described above, aside from the including of the recesses for interlocking with mechanical interlock 35.

In some examples, coating 36 may include one or more layers that can be mildly ferromagnetic. This may help reduce or eliminate the presence of magnetic air-gaps between magnetic core 32 and the ferromagnetic material, if present, within rotor hub 38.

In some examples, the at least one nano-crystalline layer of coating 36 can be made using the same material as rotor hub 38 to minimize localized stress due to differences in CTE. For example, if a type of high-strength steel or superalloy, e.g., nickel-chromium superalloy or Inconel, or other strong material is used for rotor hub 38, then the at least one nano-crystalline layer of coating 36 can be made from the same material. In some such examples, the nano-crystalline layer of coating 36 may be positioned directly adjacent to rotor hub 38. Additionally, or alternatively, the plurality of permanent magnets (e.g., permanent magnets 14 of FIG. 1) in the rotor assembly may be arranged as a Halbach array, to eliminate a need to form rotor hub 38 using a ferromagnetic material (e.g., magnetic steel). The thickness of coating 36, as described above for coating 16, can also be finely tuned to improve the stress gradients at the root area. In some examples, the thickness of coating 36 (e.g., thickness of the encapsulating layers) may be about 25.4 μm to about 254 μm.

As shown in FIG. 4, mechanical interlock 35 is in the shape of a fir-tree joint. However, as described above, mechanical interlock 35 can take the shape of any suitable configuration to help mechanically couple and retain permanent magnet 30 to rotor hub 38. The interference or frictional fit between rotor hub 38 and permanent magnet 30 will help permanent magnet 30 remain in a relatively constant position against rotor hub 38.

Figure 5:
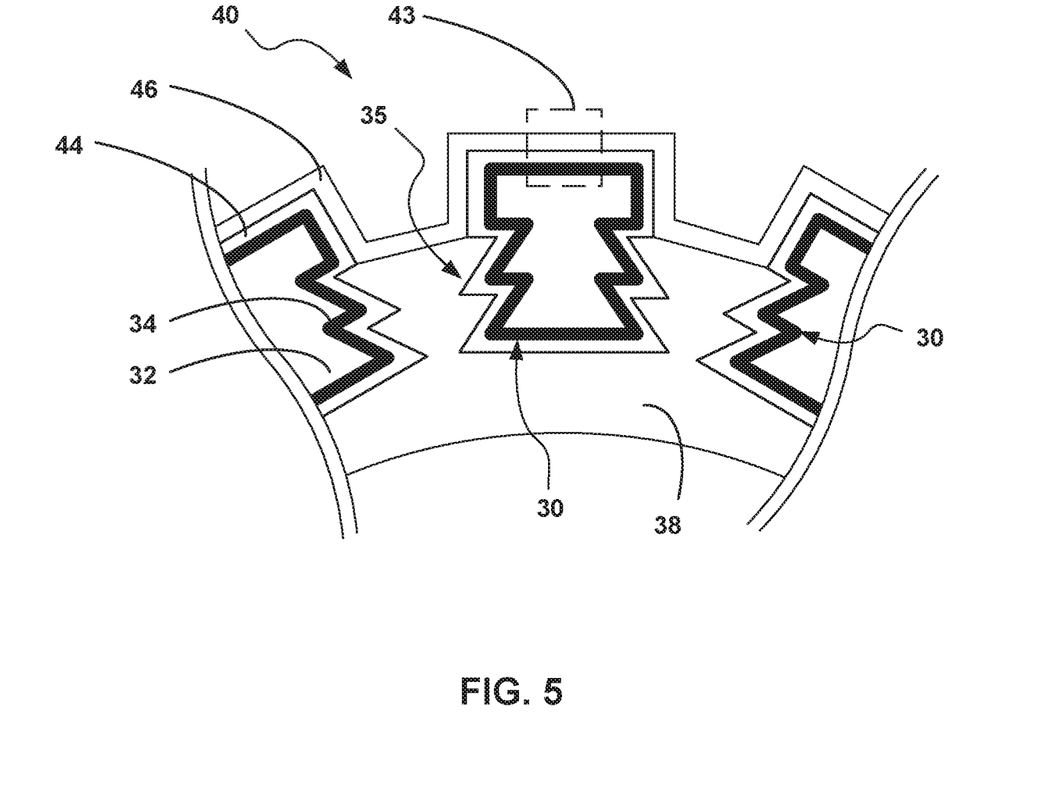
FIG. 5 is a cross-sectional view of an example rotor assembly that includes a plurality of permanent magnets that include a coating and are coupled to a rotor hub via a mechanical interlock.
Figure 6:
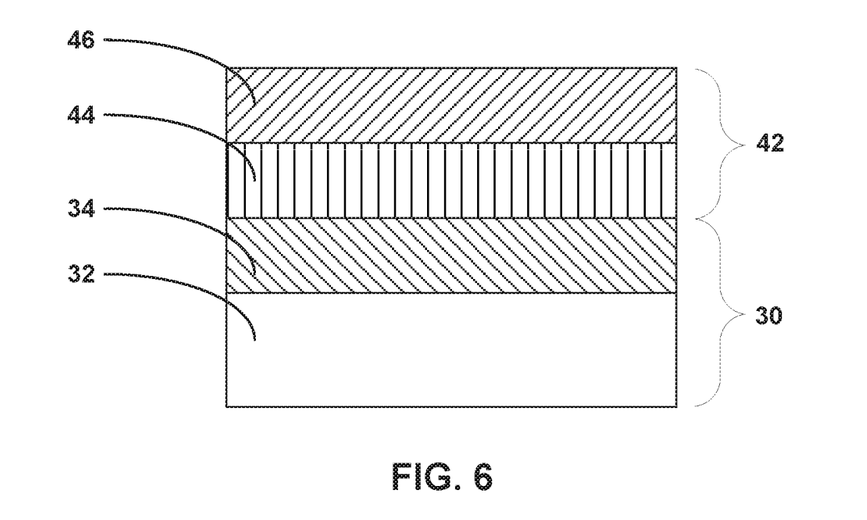
FIG. 6 is an enlargement of a section of FIG. 5 showing the layers of the rotor assembly.

In some examples, one or more additional coating layers may be applied to coating 36, which are used to form a retaining band around rotor hub 38. FIG. 5 is a cross-sectional view of an example rotor assembly 40 that includes plurality of permanent magnets 30 that include a first coating 44 and a second coating 46. Each magnet 30 is coupled to rotor hub 38 via mechanical interlock 35. FIG. 6 is an enlargement of section 43 of FIG. 5 showing the layers of rotor assembly 40. Plurality of permanent magnets 30 and rotor hub 38 may be substantially the same as those described above with respect to FIG. 4.

First coating 44 may substantially encapsulate (e.g., encapsulate or nearly encapsulate) each individual permanent magnet 30 and second coating 46 may forms a retaining band that circumferentially surrounds rotor hub 38 and plurality of permanent magnets 30 to couple permanent magnets 30 to rotor hub 38. Each of first and second coatings 44 and 46 may include at least one nano-crystalline layer. First coating 44 is positioned on permanent magnet 30 such that it is between permanent magnet 30 and second coating 46.

First coating 44 that substantially encapsulates the individual permanent magnets 30 may be substantially the same as coating 36 described above with respect to FIG. 4. Second coating 46 that forms a retaining band may be substantially the same as either coating 16 or 20 described above with respect to FIGS. 1 and 2. First and second coatings 44 and 46 may each include at least one nano-crystalline layer comprising a metal or metal alloy, the at least one nano-crystalline layer defining an average grain size of less than 50 nanometers (nm).

First coating 44 and second coating 46 provide high strength to physical structure and retention of permanent magnets 30. The total thickness of first coating 44 and second coating 46 measured radially outward from the surface of permanent magnet 30 may be less than that of a conventional retaining sleeve.

Figure 7:
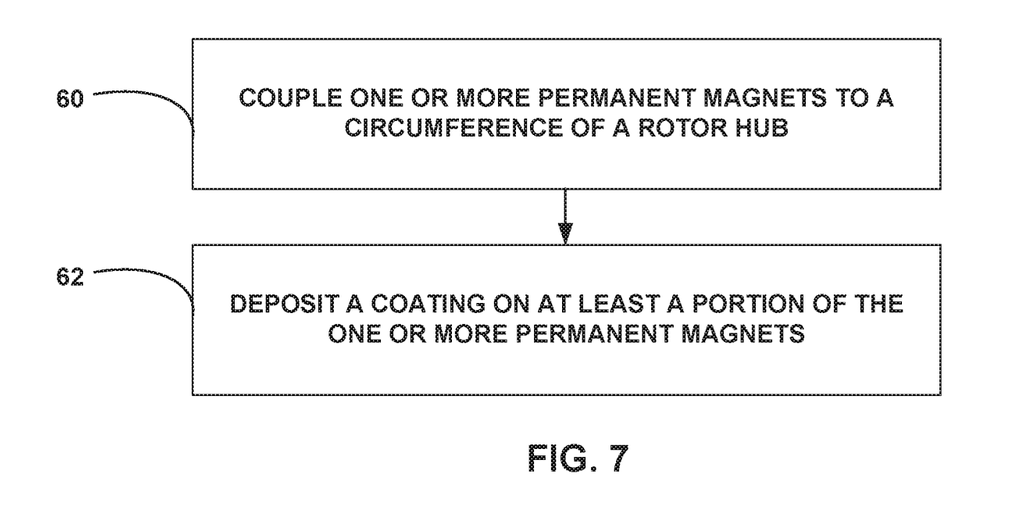
FIGS. 7 and 8 are flow diagrams illustrating example techniques for forming a rotor assembly that includes a coating including at least one nano-crystalline layer on a permanent magnet.
Figure 8:
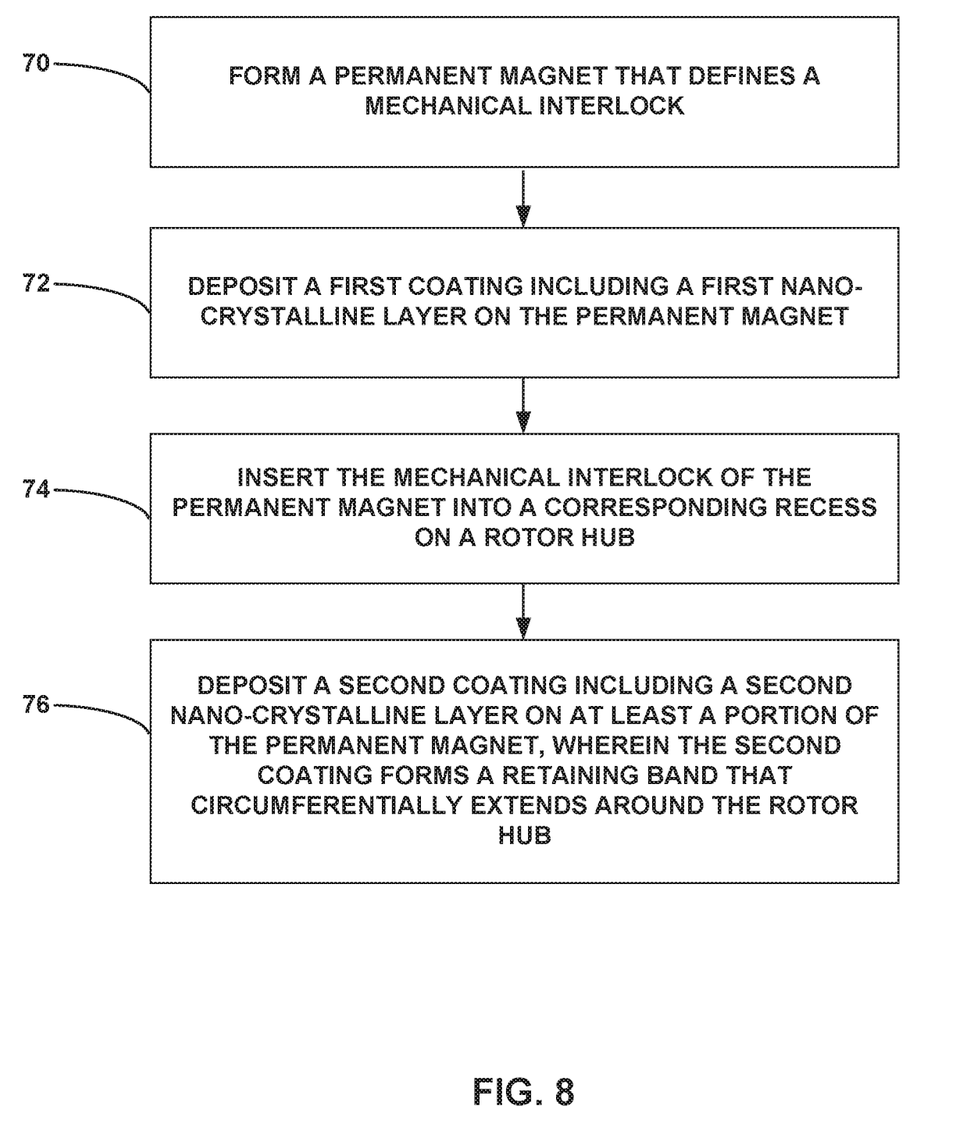

FIGS. 7 and 8 are flow diagrams illustrating example techniques for forming a rotor assembly that includes a coating including at least one nano-crystalline layer on a permanent magnet. The techniques of FIGS. 7 and 8 will be described with respect to rotor assemblies 18 and 40 of FIGS. 2 and 5 for ease of description only. A person having ordinary skill in the art will recognize and appreciate that the techniques of FIGS. 7 and 8 may be used to form rotor assemblies other than those of FIGS. 2 and 5 and rotor assemblies 18 and 40 may be formed using techniques other than those described in FIGS. 7 and 8.

FIG. 7 illustrates a flow diagram of an example technique of forming rotor assembly 18 that includes coupling one or more permanent magnets 14 to a circumference of a rotor hub 12 (60) and depositing a coating 20 on at least a portion of one or more permanent magnets 14 (62).

Permanent magnets 14 may be coupled to rotor hub 12 using any suitable technique. For example, permanent magnets 14 may be attached to rotor hub 12 using an adhesive. Additionally, or alternatively, at least a portion of a coating that includes a nano-crystalline layer may form a retaining band that surrounds the rotor hub 12 and the one or more permanent magnets 14 to couple the permanent magnets to rotor hub 12 (e.g., second coating 46). Additionally, or alternatively, permanent magnets 30 may be shaped to each include one or more mechanical interlocks 35 (e.g., dove-tail joints) that correspond with respective recesses on rotor hub 12 to provide a friction fit that helps retain permanent magnets 14 to rotor hub 12 and permanent magnets 30 may include an encapsulating coating that includes a nano-crystalline layer to provide structural strength to permanent magnets 30 (e.g., first coating 44).

The technique of FIG. 7 also includes depositing a coating 20 on at least a portion of one or more permanent magnets 14 (62). As described above, coating 20 can include at least one nano-crystalline layer comprising a metal or metal alloy. The at least one nano-crystalline layer can have an average grain size of less than about 50 nanometers (nm) and may be formed using electrodeposition. For example, rotor hub 12 including permanent magnets 14 may be suspended in suitable electrolyte solution that includes the selected metal or metal alloy for the nano-crystalline layer. A pulsed or direct current (DC) may then be applied to rotor hub 12 and permanent magnets 14 to plate at least a portion of permanent magnets 14 with the fine-grained metal to form the nano-crystalline layer to a desired thickness and average grain size. In some examples, a pulsed current may be utilized to obtain an average grain size of less than about 50 nm (e.g., less than about 20 nm).

In some examples, coating 20 may be deposited on permanent magnets 14 as a plurality of layers 22. In some examples, the strength and retention properties of coating 20 may be increased by configuring coating 20 to include at least two layers 22 that define different CTEs. By altering the CTEs of plurality of layers 22 of coating 20 in this way, one or more of layers 22 may induce a compressive stress (e.g., towards the central axis of rotor hub 12) on permanent magnets 14 and any underlying layers 22 at room temperature or as the temperature of rotor assembly 10 increases. The compressive stresses imposed by plurality of layers 22 may mimic the shrink-fit characteristics a conventional metal retaining sleeve or ring. Plurality of layers 22 may include one or more layer sets 24A-24C composed of layers with alternating CTEs.

FIG. 8 illustrates a flow diagram of an example technique of forming rotor assembly 40 that includes forming permanent magnet 30 that defines mechanical interlock 35 (70), depositing first coating 44 that includes a first nano-crystalline layer on permanent magnet 30 (72), inserting mechanical interlock 35 of permanent magnet 30 into a corresponding recess of rotor hub 38 (74), and optionally depositing second coating 46 that includes a second nano-crystalline layer on at least a portion of permanent magnet 30, wherein second coating 46 forms a retaining band that circumferentially extends around rotor hub 38 (76).

Permanent magnet 30 may be formed using any suitable technique. In some examples, permanent magnet 30 may be shaped using a cast molding process or similar method. First, magnetic core 32 material may be sintered in a desired shape and then a polymer coating applied to form polymer underlay 34 to create permanent magnet 30. Prior to the electrodeposition process to form first coating 44 and second coating 46, portions of permanent magnet 30 may be initially metalized at select locations with a base layer of metal to facilitate the deposition process of forming the one or more nano-crystalline layers of first coating 44 and second coating 46. The body of permanent magnet 30 may be shaped to include a mechanical interlock 35 that is configured to provide a friction fit with a corresponding recess of rotor hub 38. Mechanical interlock 35 may take a variety of shapes and configurations including, for example, dovetail joint, fir-tree recess, triangular, round, or other geometrical shaped joints, wedge-shaped joint, tongue-and-groove, mortise and tenon, or other interference-type joints.

The technique of FIG. 8 also includes depositing first coating 44 that includes a first nano-crystalline layer on permanent magnet 30 (72). First coating 44 may substantially encapsulate (e.g., encapsulate or nearly encapsulate) permanent magnet 30 to provide structural strength to permanent magnet 30. The one or more nano-crystalline layers of first coating 44 and second coating 46 may be formed using any of the techniques described above (e.g., electrodeposition) such that the layer defines an average grain size of less than about 50 nanometers (nm). In some examples, first coating 44 may define a total thickness of about 25.4 μm to about 254 μm.

One formed and coated, mechanical interlock 35 of permanent magnet 30 may be inserted into a corresponding recess of rotor hub 38 (74). Mechanical interlock 35 may couple permanent magnet 30 and rotor hub 38 together based on their correspondingly shaped configurations to produce an interference or friction fit that overcomes the centrifugal forces applied during rotation and prevent radial displacement of the two components. In some examples, the interference-fit for permanent magnet 30 can create a secure fit with rotor hub 38 without the use of adhesive bonding.

The technique of FIG. 8 also includes optionally depositing second coating 46 that includes a second nano-crystalline layer on at least a portion of permanent magnet 30, wherein second coating 46 forms a retaining band that circumferentially extends around rotor hub 38 (76). First and second coatings 44 and 46 may be formed using one or more of the same or similar deposition techniques (e.g., electrodeposition) such that first and second coatings 44 and 46 are integrally formed as part of the same coating and are distinguished merely by whether the respective portion substantially encapsulates individual permanent magnets 30 or forms a continuous loop around rotor hub 38. The one or more layers forming second coating 46 may be deposited using any of the suitable techniques described above. In some examples, second coating 46 that forms the retaining band, may define a thickness of less than about 1.5 mm as measured in a radial direction of rotor hub 38.

In some examples, second coating 46 may include a plurality of layers substantially similar to plurality of layers 22 described above with respect to coating 20. Plurality of layers 22 may include the at least one nano-crystalline layer and may comprise layers with different coefficients of thermal expansion to provide additional retention stress on plurality of permanent magnets 30 during operation as the temperature of rotor assembly 40 increases. In some examples, one or more layers of second coating 46 may be deposited within a temperature range of 50-65° C. to produce a compressive pre-stress on permanent magnets 30.

Various examples have been described. These and other examples are within the scope of the following claims.

What is claimed is:

1. A rotor assembly comprising:
a rotor hub;
a plurality of permanent magnets positioned circumferentially around at least a portion of the rotor hub; and
a coating on at least a portion of the plurality of permanent magnets, wherein the coating forms a retaining band that circumferentially extends around the rotor hub and the plurality of permanent magnets, wherein the coating comprises:
a first layer defining a first coefficient of thermal expansion; and
a nano-crystalline layer comprising a metal or metal alloy, wherein the nano-crystalline layer has an average grain size of less than about 50 nanometers (nm), wherein the nano-crystalline layer has a second coefficient of thermal expansion, and wherein the first coefficient of thermal expansion is different than the second coefficient of thermal expansion.

2. The rotor assembly of claim 1, wherein the metal or metal alloy of the at least one nano-crystalline layer comprises at least one of cobalt, nickel, copper, iron, cobalt-based alloy, nickel-based alloy, copper-based alloy, or iron-based alloy.

3. The rotor assembly of claim 1, wherein:
the first coefficient of thermal expansion is greater than the second coefficient of thermal expansion;
the at least one nano-crystalline layer comprises nickel; and
the first layer is positioned between the rotor hub and the at least one nano-crystalline layer.

4. The rotor assembly of claim 1, wherein the first coefficient of thermal expansion is greater than about 13 ppm/° C. and the second coefficient of thermal expansion is less than about 7 ppm/° C.

5. The rotor assembly of claim 1, wherein a difference between the first coefficient of thermal expansion and the second coefficient of thermal expansion is greater than about 6 ppm/° C.

6. The rotor assembly of claim 1, wherein the coating comprises a plurality of layer sets, each layer set comprising:
a first layer defining a first coefficient of thermal expansion; and
a second layer defining a second coefficient of thermal expansion different than the first coefficient of thermal expansion, wherein at least one of the first layer or the second layer is a layer of nano-crystalline metal or metal alloy defining an average grain size of less than about 50 nanometers (nm).

7. The rotor assembly of claim 1, wherein the coating comprises a plurality of nano-crystalline layers.

8. The rotor assembly of claim 1, wherein the retaining band has a tensile strength of at least about 1,100 MPa.

9. The rotor assembly of claim 1, wherein the coating further comprises at least one layer comprising a ferromagnetic material.

10. The rotor assembly of claim 1, wherein at least one permanent magnet of the plurality of permanent magnets defines a mechanical interlock, the rotor hub defining a recess along the circumference of the rotor hub configured to receive the mechanical interlock of the at least one permanent magnet to retain the at least one permanent magnet against the rotor hub and substantially prevent radial movement of the at least one permanent magnet.

11. The rotor assembly of claim 10, wherein the coating comprises a first coating, the rotor assembly further comprising a second coating, wherein the second coating substantially encapsulates the at least one permanent magnet, wherein the second coating comprises a second nano-crystalline layer comprising a metal or metal alloy, and wherein the second nano-crystalline layer defines an average grain size of less than about 50 nanometers (nm).

12. The rotor assembly of claim 11, wherein the at least one permanent magnet comprises a polymeric layer over a magnetic core, and wherein the polymeric layer is positioned between the second nano-crystalline layer and the magnetic core.

13. A rotor assembly comprising:
a rotor hub;
a plurality of permanent magnets positioned circumferentially around at least a portion of the rotor hub; wherein at least one permanent magnet of the plurality of permanent magnets defines a mechanical interlock, the rotor hub defining a recess along the circumference of the rotor hub configured to receive the mechanical interlock of the at least one permanent magnet to retain the at least one permanent magnet against the rotor hub and substantially prevent radial movement of the at least one permanent magnet; and a coating that forms a retaining band that circumferentially extends around the rotor hub and the plurality of permanent magnets, the coating comprising:
- a first nano-crystalline layer comprising a metal or metal alloy, wherein the first nano-crystalline layer defines an average grain size of less than about 50 nanometers (nm), and wherein the first nano-crystalline layer has a first coefficient of thermal expansion; and
- a second nano-crystalline layer comprising a metal or metal alloy, wherein the second nano-crystalline layer has an average grain size of less than about 50 nanometers (nm), and wherein the second nano-crystalline layer has a second coefficient of thermal expansion different from the first coefficient of thermal expansion of the first nano-crystalline layer.

* * * * *